US010634225B1

(12) United States Patent
Xiong et al.

(10) Patent No.: US 10,634,225 B1
(45) Date of Patent: Apr. 28, 2020

(54) FINGER OF ROBOTIC HAND AND ROBOT HAVING THE SAME

(71) Applicant: UBTECH Robotics Corp, Shenzhen (CN)

(72) Inventors: Youjun Xiong, Shenzhen (CN); Kunlei Zhao, Shenzhen (CN); Wenhua Yu, Shenzhen (CN); Qi Zhao, Shenzhen (CN); Jiawen Hu, Shenzhen (CN); Yangyu Pi, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/236,348

(22) Filed: Dec. 29, 2018

(30) Foreign Application Priority Data

Oct. 31, 2018 (CN) .......................... 2018 1 1291574

(51) Int. Cl.
  *B25B 15/00* (2006.01)
  *B25J 15/06* (2006.01)
  *B25J 15/08* (2006.01)
  *F16H 21/18* (2006.01)
  *F16C 1/16* (2006.01)

(52) U.S. Cl.
  CPC .............. *F16H 21/18* (2013.01); *B25J 15/08* (2013.01); *F16C 1/16* (2013.01)

(58) Field of Classification Search
  CPC ....... F16H 21/18; B25J 15/08; B25J 15/0009; F16C 1/16
  USPC ................................................ 294/106, 111
  See application file for complete search history.

(56) References Cited

U.S. PATENT DOCUMENTS

| | | | | |
|---|---|---|---|---|
| 4,350,381 A | * | 9/1982 | Hellmann | B25J 15/0009 269/266 |
| 4,921,293 A | * | 5/1990 | Ruoff | A61F 2/583 294/106 |
| 4,957,320 A | * | 9/1990 | Ulrich | B25J 9/102 192/56.1 |
| 5,247,738 A | * | 9/1993 | Yoshii | F04C 23/008 29/888.022 |
| 5,257,871 A | * | 11/1993 | Zona | B25J 5/02 104/93 |
| 6,817,641 B1 | * | 11/2004 | Singleton, Jr. | B25J 9/102 294/106 |
| 7,445,260 B2 | * | 11/2008 | Nihei | B25J 9/1612 294/106 |
| 8,297,672 B2 | * | 10/2012 | Kim | B25J 9/104 294/106 |
| 10,518,420 B1 | * | 12/2019 | Xiong | B25J 15/12 |

(Continued)

*Primary Examiner* — Paul T Chin

(57) ABSTRACT

A finger of a robotic hand includes a phalanx portion including at least two phalanxes rotatably coupled to each other, a driving device including a rotating member, a connection assembly including a housing defining a sliding groove that includes a first end and a second end defining a through hole that is in communication with the sliding groove, a cap connected to the housing at the first end, a sliding rod comprising a base slidably received in the sliding groove and a rod protruding from the base, and an elastic member received in the sliding groove and having opposite ends that respectively abut against the base and an inner surface of the second end, and a rope including two opposite ends respectively connected to the cap and one of the at least two phalanxes.

10 Claims, 4 Drawing Sheets

(56) References Cited

U.S. PATENT DOCUMENTS

| | | | | |
|---|---|---|---|---|
| 2002/0060465 | A1* | 5/2002 | Laliberte | B25J 15/0009 |
| | | | | 294/106 |
| 2003/0183026 | A1* | 10/2003 | Korniyenko | F01B 9/026 |
| | | | | 74/49 |
| 2004/0144670 | A1* | 7/2004 | Riley | A61L 2/26 |
| | | | | 206/370 |
| 2013/0057004 | A1* | 3/2013 | Murata | B25J 15/0009 |
| | | | | 294/106 |

* cited by examiner

FINGER OF ROBOTIC HAND AND ROBOT HAVING THE SAME

CROSS REFERENCE TO RELATED APPLICATIONS

This application claims priority to Chinese Patent Application No. 201811291574.3, filed Oct. 31, 2018, which is hereby incorporated by reference herein as if set forth in its entirety.

BACKGROUND

1. Technical Field

The present disclosure generally relates to robots, and particularly to a finger of a robotic hand and a robot including the finger.

2. Description of Related Art

Manipulable hand-like apparatuses are utilized in several industries. One such apparatus is a multi-fingered robotic hand. The multi-fingered robotic hand includes a plurality of digits capable of performing certain grasping operations. It is always desirable and useful to provide a robotic hand that is simple in structure and has damage-proof ability in certain scenarios.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
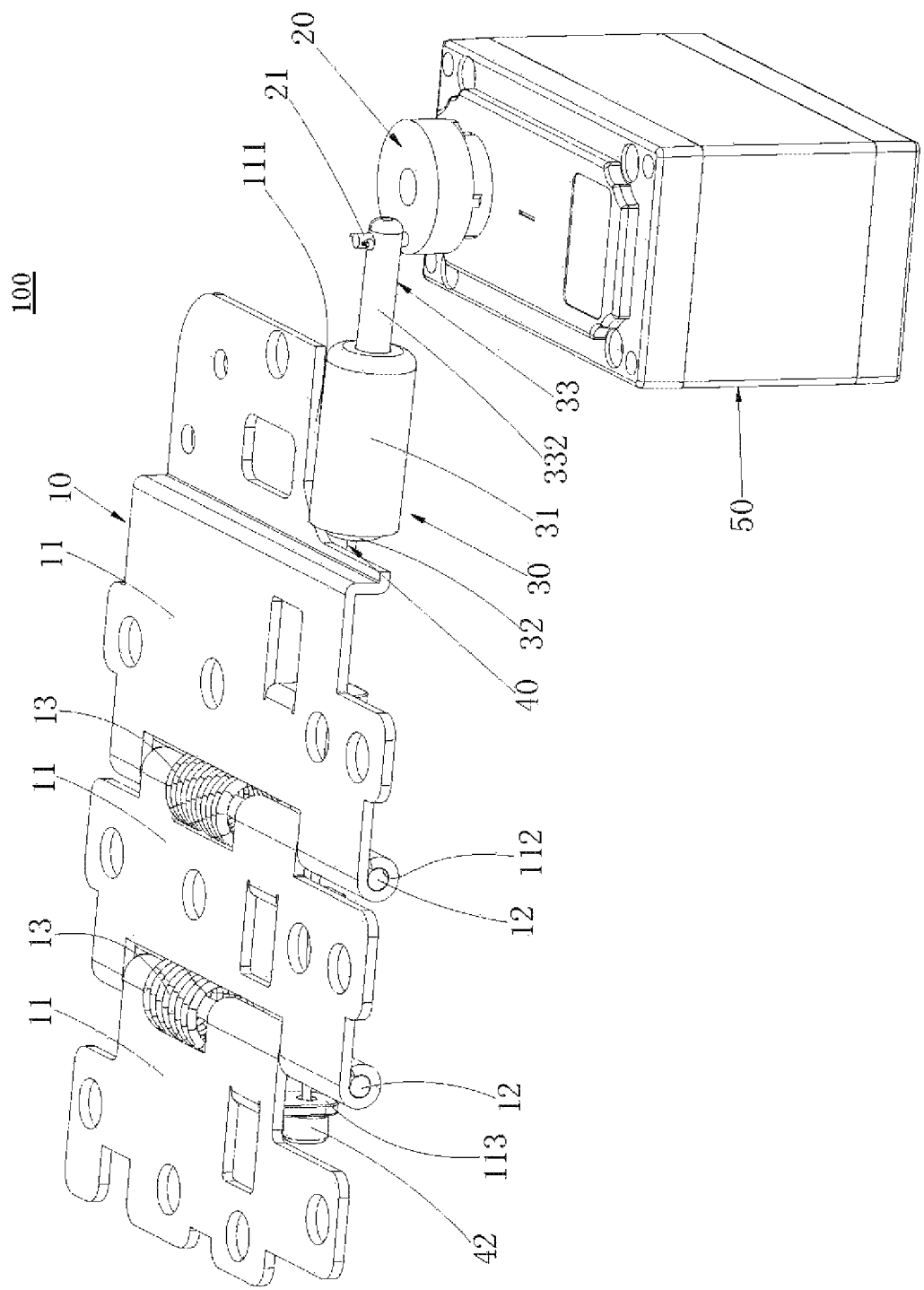
FIG. 1 is a schematic isometric view of a finger of a robotic hand according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
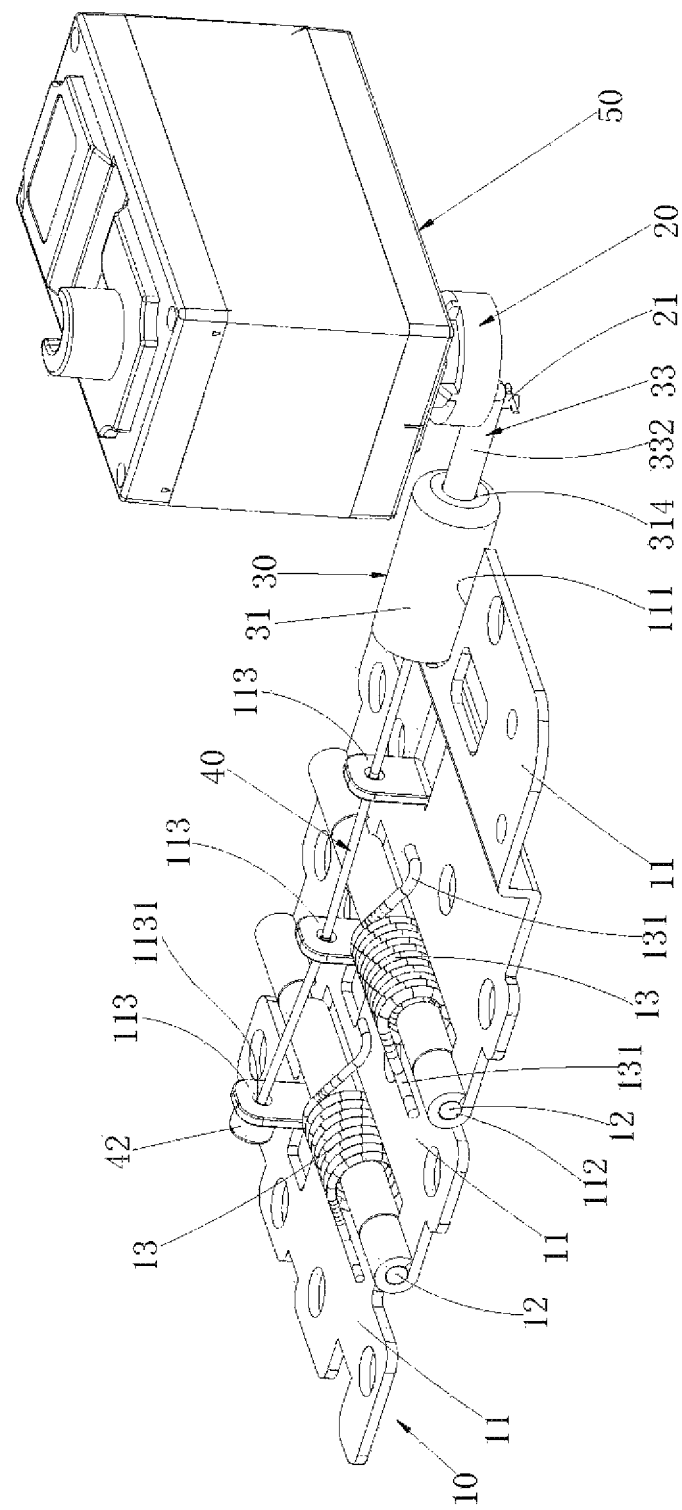
FIG. 2 is similar to FIG. 1, but viewed from a different perspective.
Figure 3:
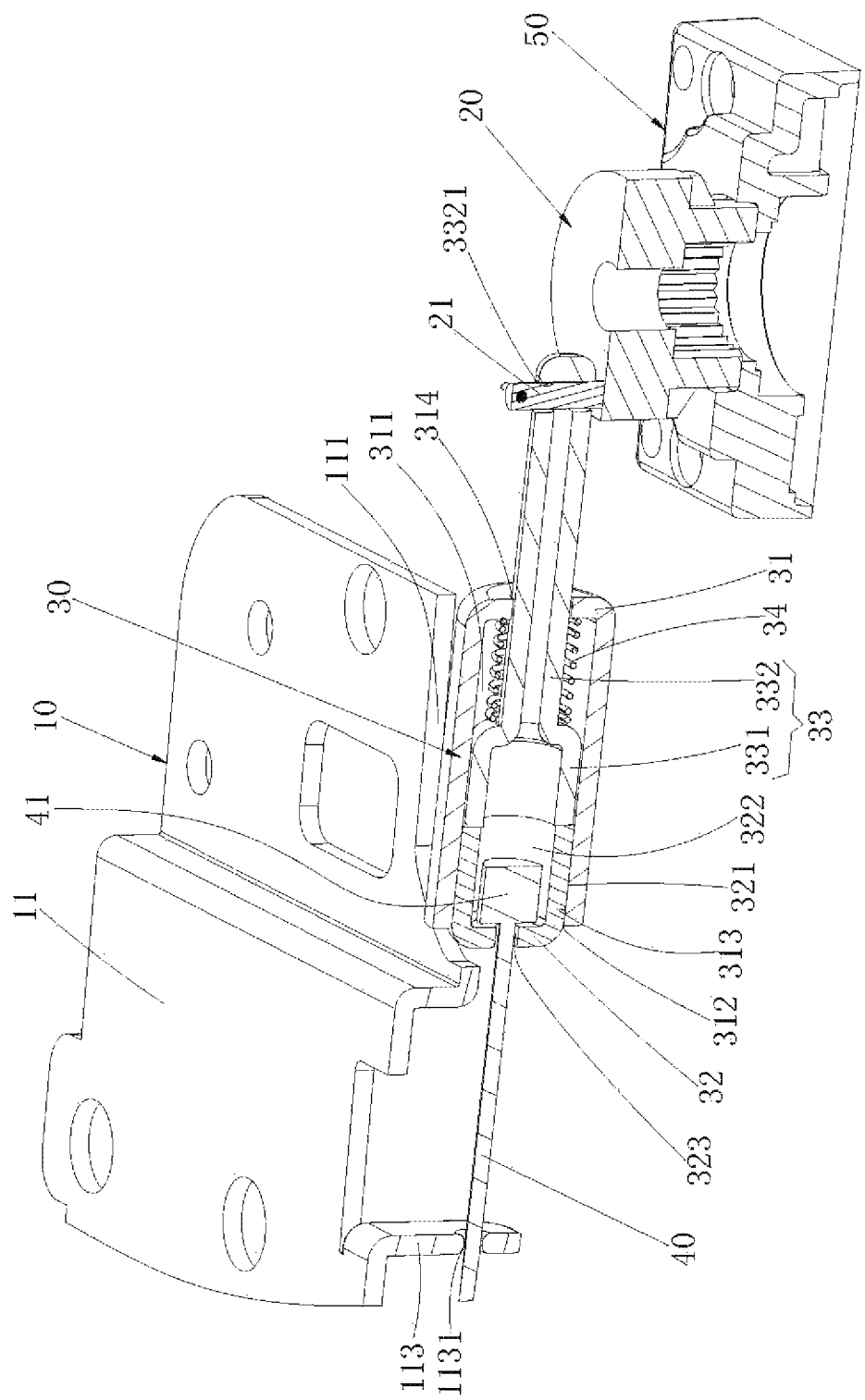
FIG. 3 is an isometric partial cross-sectional view of the driving device of FIG. 1.

Referring to FIGS. 1-3, a finger 100 of a robotic hand includes a phalanx portion 10, a driving device 50 including a rotating member 20, a connection member 30, and a rope 40. The phalanx portion 10 includes at least two phalanxes 11 rotatably coupled to each other. The connection assembly 30 includes a housing 31 defining a sliding groove 311 which comprises a first end and a second end defining a through hole 314 that is in communication with the sliding groove 311, a cap 32 connected to the housing 31 at the first end, a sliding rod 33 including a base 331 slidably received in the sliding groove 311 and a rod 332 protruding from the base 331, and an elastic member 34 received in the sliding groove 311 and having two opposite ends that respectively abut against the base 331 and an inner surface of the second end. The rod 332 passes through the through hole 314 of the second end and is connected to the rotating member 20 in such a way that rotation of the rotating member 20 drives the rod 332 to move along the sliding groove 311. The elastic member 34 is used to be deformed and push the housing 31 to move. The rope 40 has two opposite ends respectively connected to the cap 32 and one of the at least two phalanxes 11. The rope 40 is used to pull the one of the at least two phalanxes 11 to rotate when pulled by the housing 31. Rotation of the phalanxes 11 will cause the finger to flex or extend.

During operation, the driving device 50 drives the rotating member 20 to rotate, and the rotating member 20 then drives the sliding rod 33 of the connection assembly 30 to move away from the phalanx portion 10. The elastic member 34 is urged to be deformed by the sliding rod 33 and then drives the housing 31 move away from the phalanx portion 10. The housing 31 then pulls the rope 40 that then pulls the one of the at least two phalanxes 11 to rotate toward the connection assembly 30, which causes the finger 100 to flex. When the rotation of the rotating member 20 drives the sliding rod 33 of the connection assembly 30 to move toward the phalanx portion 10, a torsion spring, which will be described in detail later, will rebound and cause the one of the at least two phalanxes 11 to rotate away from the connection assembly 30, which causes the finger 100 to extend.

The finger above has the following advantages: The finger requires less components and its structure is simple. Flexion and extension of the finger can be achieved through engagement of the rope 40, the rotating member 20 and the connection assembly 30. By selecting a proper elastic member 34, desirable bending state of the finger can be realized with one degree of freedom. When external force acting on the rope 40 is sufficiently large, the elastic member 34 will be compressed and buffer the external force. The finger can flex so as to avoid damage from hard shocks. The driving device 50 can be set to operate at a non-limit state, which effectively avoid damage due to failure of the driving device 50. In the embodiment, the elastic member 34 is pre-compressed when the finger 100 is in a fully extended state. If there is no abnormal external force exerted on the finger 100, the elastic member 34 will be in a compressed stated. When a pulling force from the rope 40 is sufficient, the elastic member 34 will be further compressed so as to avoid damage caused by hard shock.

Each phalanx portion 11 is plate-shaped and easy to shape. The phalanx portion 11 defines a number of mounting holes for connection with other components by fasteners. The joint portion 11 defines a notch ill at the edge facing the rotating member 20, and the connection assembly 30 is located within the notch i1 1i, so that the overall structure is compact. The driving device 50 can be a servo including an output shaft and the rotating member is fixed to and rotatable together with the output shaft. The rotating member 20 transmits mechanical power of the driving device 50 to the sliding rod 33 of the connection assembly 30 to move the sliding rod 33. The rotating member 20 is a disc and is easy to assemble.

The housing 31 is hollow and the sliding groove is in the form of a cylindrical chamber. The end cap 32, the elastic member 34 and a portion of the sliding rod is received in the sliding groove 311. The rope 40 can be a wire rope.

Two opposite ends of the elastic member 34 respectively abut against the inner wall of the housing 31 and the sliding rod 33, and the elastic member 34 is preloaded. When external force acting on the rope 40 is sufficiently large, the elastic member 34 will be compressed and buffer the external force, which can prevent the external force from transmitting to the driving device 50. The finger can flex so as to avoid damage from hard shocks. The driving device 50 can be set to operate at a non-limit state, which effectively avoid damage due to failure of the driving device 50.

In one embodiment, the first end of the sliding groove 311 defines a threaded opening 312. That is, the opening 312 includes inner thread 313 in its lateral surface. The cap 32 includes a threaded portion 321 engaged with the thread 313, which fixes the cap 32 to the housing 31. The position of the cap 32 can be adjusted by screwing the cap 32 to adjust the preload of the elastic member 34. The cap 32 can also be coupled to the housing 31 by other suitable means according to need.

In one embodiment, the base 331 abuts against the cap 32. One end of the rod 332 is rotatably connected to the rotating member 20. The base 331 and the sliding groove are both cylindrical. The diameter of the base 331 is greater than that of the rod 332. The elastic member is arranged around the rod 332 and the two opposite ends of the elastic member abut against the base 331 and the inner wall of an end of the housing 31. The diameter of the base 331 is substantially the same as the inner diameter of the sliding groove 311 of the housing 31. The base 331 is slidably received in the sliding groove 311 of the housing 31, and the rod 332 is slidably connected to the housing 31. One end of the rod 332 away from the base 331 is connected to the driving device 50 through the rotating member 20.

In one embodiment, the elastic member 34 is a coil spring, and the spring is arranged around the rod 332, and opposite ends of the spring respectively abut against the base 331 and the inner wall of the housing 31. The elastic member 34 is compressed between the base 331 and one end of the housing 31.

In one embodiment, an end of the rod 332 defines a through hole 3321. The rod 332 is rotatably connected to the rotating member 20 through an axle 21 passing through the through hole 3321. One end of the axle 21 is connected to the rotating member 20. With such configuration, rotation of the rotating member 20 can be converted into the sliding movement of the rod 332.

In one embodiment, the number of the phalanxes 11 is three. Each phalanx 11 defines an axle hole 112, and two adjacent phalanxes 11 are rotatably connected to each other by an axle 12 passing through the axle holes 112 of the two phalanxes 11. Each phalanx 11 is made of sheet metal. In the embodiment, the axle hole 112 is formed by bending an edge of each phalanx 11.

In one embodiment, the finger 100 further includes a torsion spring 13 arranged around each axle 12. The torsion spring 13 includes two arms 131 respectively abutting against the two phalanxes 11 connected by the axle 12. When the rope 40 is pulled by the housing 31, the phalanxes 11 rotate with respect to one another toward the housing 31, causing the finger 100 to flex and twisting the torsion springs 13. When the housing 31 stops pulling the rope 40, the torsion spring 13 rebounds and urge the phalanxes 11 to rotate away from the housing 31, causing the finger 100 to extend.

In one embodiment, each phalanx 11 includes a protruding tab 113 defining a through hole 1131. The rope 40 sequentially passes through the through hole 1131 of the protruding tabs 113. When the rope 40 was pulled to move toward the rotating member 20, the rope 40 pulls the phalanxes 11 to rotate, thus causing the finger 100 to flex.

In one embodiment, the cap 32 defines a cavity 322 and an orifice 323 in an end thereof. The cavity 322 communicates with the orifice 323. The rope has two heads 41 and 42 at opposite ends thereof. The rope 40 passes through the orifice 323 and the head 41 is received in the cavity 322 so as to connect the rope 40 to the cap 32. The head 41 is substantially cylindrical, and the inner cavity 322 is substantially cylindrical. When the head 41 abuts against the inner wall of the cap 32, the cable 40 can move when pulled by the housing.

The head 42 abuts against one of the tabs 113, which allows the rope 40 to apply a pulling force to the one of the tabs 113. When the rotating member 20 rotates and drives the housing 31 to pull the rope 40, the rope 40 pulls a corresponding phalanx 11 through the engagement of the head 42 with the tab 113, which causes the phalanxes 11 to rotate with one another toward the housing 31, thus causing the finger 100 to flex.

Figure 4:
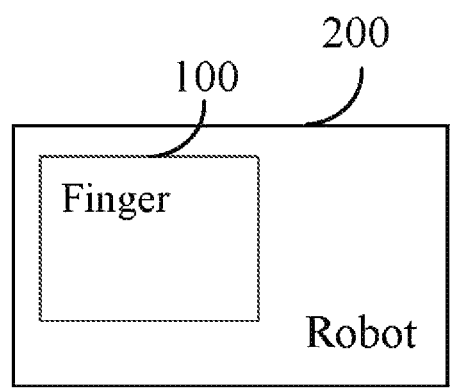
FIG. 4 is a schematic block diagram of a robot including the finger of FIG. 1.

Referring to FIG. 4, in one embodiment, a robot includes a finger 100 as described above.

The driving device 50 drives the rotating member 20 to rotate, and the sliding rod 33 of the connection assembly 30 is driven by the rotating member 20 to move. When the sliding rod 33 moves away from the phalanx portion 10, the elastic member 34 is compressed and pushes the housing 31 to move toward the rotating member 20. The rope 40 is pulled to move toward the rotating member 20, and the phalanx portion 10 is then pulled to rotate toward the rotating member 20, causing the finger to flex. When the sliding rod 33 moves toward the phalanx portion 10, the torsion springs 13 rebound and cause the phalanxes 11 to rotate away from the connection assembly 30, which causes the finger 100 to extend.

The finger above has the following advantages: The finger requires less components and its structure is simple. Flexion and extension of the finger can be achieved through engagement of the rope 40, the rotating member 20 and the connection assembly 30. By selecting a proper elastic member 34, desirable bending state of the finger can be realized with one degree of freedom. When external force acting on the rope 40 is sufficiently large, the elastic member 34 will be compressed and buffer the external force. The finger can flex so as to avoid damage from hard shocks. The driving device 50 can be set to operate at a non-limit state, which effectively avoid damage due to failure of the driving device 50.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A finger of a robotic hand, comprising:
   a phalanx portion comprising at least two phalanxes rotatably coupled to each other;
   a driving device comprising a rotating member,
   a connection assembly comprising:
      a housing defining a sliding groove that comprises a first end and a second end defining a through hole that is in communication with the sliding groove;
      a cap connected to the housing at the first end;
      a sliding rod comprising a base slidably received in the sliding groove and a rod protruding from the base, the rod passing through the through hole of the second end and being connected to the rotating member in such a way that rotation of the rotating member drives the rod to move along the sliding groove; and
      an elastic member received in the sliding groove and comprising two opposite ends that respectively abut against the base and an inner surface of the second end, the elastic member being configured to be deformed and push the housing to move;
      a rope comprising two opposite ends respectively connected to the cap and one of the at least two phalanxes, the rope being configured to pull the one of the at least two phalanxes to rotate when pulled by the housing.

2. The finger according to claim 1, wherein the first end defines a threaded opening, the cap comprises a threaded portion engaged with the threaded opening, which fixes the cap to the housing.

3. The finger according to claim 2, wherein the rod is rotatably connected to the rotating member.

4. The finger according to claim 3, wherein the elastic member is a coil spring arranged around the rod.

5. The finger according to claim 3, further comprising an axle fixed to the rotating member, wherein the rod defines a receiving hole to rotatably receive the axle so as to rotatably connect the rod to the rotatably member.

6. The finger according to claim 1, further comprising an axle, wherein each of the at least two phalanxes defines an axle hole, the axle is fixed in the axle hole of one of the at least two phalanxes and rotatably fit in the axle hole of the other one of the at least two phalanxes.

7. The finger according to claim 6, further comprising a torsion spring, wherein the torsion spring is arranged around the axle and comprises two arms respectively abutting against the at least two phalanxes.

8. The finger according to claim 1, wherein each of the at least two phalanxes comprises a protruding tab, the protruding tab defines a through hole that allows the rope to pass therethrough.

9. The finger according to claim 8, wherein the cap defines a cavity and an orifice in an end thereof, the cavity communicates with the orifice, the rope comprises two heads at opposite ends thereof, the rope passes through the orifice and one of the two heads is received in the cavity so as to connect the rope to the cap, the other one of the two heads abuts against one of the tabs, which allows the rope to apply a pulling force to the one of the tabs.

10. A robot comprising a hand that comprises a finger, the finger comprising:
   a phalanx portion comprising at least two phalanxes rotatably coupled to each other;
   a driving device comprising a rotating member;
   a connection assembly comprising:
      a housing defining a sliding groove that comprises a first end and a second end defining a through hole that is in communication with the sliding groove;
      a cap connected to the housing at the first end;
      a sliding rod comprising a base slidably received in the sliding groove and a rod protruding from the base, the rod passing through the through hole of the second end and being connected to the rotating member in such a way that rotation of the rotating member drives the rod to move along the sliding groove; and
      an elastic member received in the sliding groove and comprising two opposite ends that respectively abut against the base and an inner surface of the second end, the elastic member being configured to be deformed and push the housing to move;
   a rope comprising two opposite ends respectively connected to the cap and one of the at least two phalanxes, the rope being configured to pull the one of the at least two phalanxes to rotate when pulled by the housing.

* * * * *